US 6,561,488 B1

(12) United States Patent
Walker

(10) Patent No.: US 6,561,488 B1
(45) Date of Patent: May 13, 2003

(54) PIPELINE CABLE DEPLOYMENT APPARATUS AND METHOD

(75) Inventor: Ian Charles Walker, Bristol (GB)

(73) Assignee: Sensor Highway Limited, Andover (GB)

( * ) Notice: Subject to any disclaimer, the term of this patent is extended or adjusted under 35 U.S.C. 154(b) by 0 days.

(21) Appl. No.: 09/549,474

(22) Filed: Apr. 14, 2000

(30) Foreign Application Priority Data

Apr. 15, 1999 (GB) .............................. 9908480

(51) Int. Cl.$^7$ ............................... B65H 49/00
(52) U.S. Cl. ................ 254/134.4; 15/3.5; 15/104.061; 15/104.062
(58) Field of Search ............... 15/3.5, 3.51, 3.52, 15/104.061, 104.062; 254/134.4, 134.5

(56) References Cited

U.S. PATENT DOCUMENTS

| 252,956 | A | * | 1/1882 | Loane |
| 2,980,399 | A | * | 4/1961 | Littlefield |
| 3,547,406 | A | * | 12/1970 | Bielstein |
| 4,465,220 | A | * | 8/1984 | Ledlow et al. |
| 4,756,510 | A | * | 7/1988 | Klamm et al. |
| 4,783,054 | A | * | 11/1988 | Morel et al. |

FOREIGN PATENT DOCUMENTS

| JP | 60-22409 | * | 2/1985 |
| JP | 2-32709 | * | 2/1990 |
| JP | 5-328560 | * | 12/1993 |

* cited by examiner

Primary Examiner—Terrence R. Till
(74) Attorney, Agent, or Firm—Robert W J Usher

(57) ABSTRACT

A fiber optic communication cable is deployed in a pipeline from a static coil drawn from a rearwardly facing exit of a cassette carried by a pipeline pig as the pig is driven along the pipeline from a launcher having a drive fluid inlet and a cable anchorage with a pressure penetrator for connecting an instrumentation cable to the deployed cable.

23 Claims, 3 Drawing Sheets

PIPELINE CABLE DEPLOYMENT APPARATUS AND METHOD

This invention relates to a pipeline cable deployment apparatus and method. That is to say, it is concerned with deploying cable inside a pipeline. It is particularly suitable for the deployment of a communication cable, for example, an optical fibre or an electrical cable, containing an optical or electrical conductor, but could be adapted for use in deploying other kinds of cable.

The invention has been developed for use in the oil and gas extraction and transportation industries, and in water and gas utility pipelines, for the deployment of cable into an existing pipeline. Suitable pipelines include transmission pipelines and observation wells. The invention is not primarily intended for use in a down-well environment, but such an application is nevertheless feasible.

The purpose of deploying cable along a pipeline may be to enhance communications from one end of the pipe to the other, or to install sensors into the pipeline for intelligence gathering or for diagnostic purposes. The sensors may be particular instruments or may be integral with the cable itself. For example, as is known in the art, a fibre optic cable can function as a distributed temperature measuring device, in which the optical properties of the cable itself provide data from throughout the length of the cable by the reflection of light introduced from one end of the cable back to detectors at the same end.

In most instances, a cable is fed into a pipeline by pulling it off a reel or spool at a convenient point at one end of a pipeline or along the pipeline, and drawing the cable into and along the pipeline by using a cable towing device such as a pipeline pig, or a drogue, or by relying on friction between the cable itself and fluid flowing through the pipeline to draw the cable into and along the pipeline for the required distance.

However, the distances involved may be a matter of kilometers, and the cable needs to be sufficiently strong that lengths of cable of that order can be drawn into the pipeline under tension. Strength in turn implies weight, which may in turn require more strength. Another problem is the problem of abrasion as the cable is drawn through the pipeline for thousands of meters.

The present invention is made in response to the observation that the foregoing deployment methods rely on a supply of cable from outside the pipeline, giving rise to problems in feeding the cable into the pipeline. It is accordingly proposed instead to take a fundamentally different approach, namely to take the cable supply through the pipeline and pay it out as it goes. The major benefit of such an approach is that the deployed cable is stationary with respect to the pipeline, thereby eliminating a major source of impact and abrasion damage, and furthermore the cable does not have to be made strong enough to withstand the tension required to pull thousands of meters of its own weight through a long tube.

More specifically, a method of deploying a cable, typically a communication cable, in a pipeline comprises driving a pipeline pig forwardly along the pipeline away from one restrained end of a coil of said cable extending out of a rearwardly directed exit from an enclosure carried by the pig.

In another aspect of the invention, pipeline cable deployment apparatus comprises a pipeline pig having, in use, forward and rearward ends, and carrying an enclosure containing a coil of cable, the enclosure having an exit for the cable rearwardly of the pig.

The pipeline pig may be self-propelled. A self-propelled pig may also be called a crawler. The pig may be drawn behind a tractor. However, although the invention does embrace the use of crawlers and of towed pigs, in preferred embodiments of the invention the pig is driven by fluid pressure in the pipeline.

The pig may include sensors, such as a television camera or acoustic sensors, from which real time signals can be carried by a communication cable to remote instrumentation. It will be apparent that other forms of cable than communication cable can be deployed in accordance with the invention without departing from the fundamental concepts. In the case of a crawler, or a pig drawn by a tractor, power supply cable may be included for delivering power to a drive motor of the crawler or tractor.

Pipeline pigs are well known in the art and any appropriate pig may be used. A typical pig has a body and laterally extending means for positioning the pig in the pipeline. In the case of a fluid driven pig, the laterally extending means may be flanges or skirts extending outwardly from the pig body towards the pipeline walls. Normally, of course, pipelines tend to be cylindrical, but there is no reason in principle why other shapes should not be compatible with the invention. A suitable pig may have lateral flanges at its forward and rearward ends to stabilise it and guide it in the pipeline and allow it to be driven forward by the pipeline fluid.

The enclosure for the coil of cable may suitably be carried within the pig, on the outside of the pig, or behind the pig. It may conveniently be a fixed or removable cassette which can be single use or reloaded with a fresh coil of cable for a cable deployment run. The enclosure or cassette may be located within the pig body, or behind the rearmost flange or skirt on the rearward end of the body. The cable should be freely deployable from the exit of the enclosure well clear of any possible impediments to its smooth release. If mounted on the rearward end of the pig, the cassette or enclosure may be flexibly connected to the pig, to articulate the assembly for use in a curved pipeline.

The coil of cable may take any convenient form. Preferably it remains static with respect to the enclosure. Cable may be paid out from an outer or inner surface of the coil. Although the coil may be formed on a rotating spool or the like, this has a disadvantage in that the angular momentum of the rotating coil and spool will tend to pay out excess cable if the pig is suddenly slowed in the pipeline. Conical or cylindrical coils of cable may be suitable.

A typical coil is made up of multiple layers of cylindrical windings. These can be formed by winding cable on to a collapsible mandrel, building up as many cylindrical layers as are required to accommodate the desired cable length. The mandrel can then be collapsed and removed leaving a hollow coil which can be placed in a cylindrical cassette, one end of the cable from the inside of the coil being drawn out through the exit of the cassette in order to be fastened to an anchorage before deployment of the cable through a pipeline by loading the cassette on a pig and driving the pig through the pipeline.

Desirably, the coiled cable is coated with a weak adhesive, sufficient to bind the turns of the coil together unless tension is applied to the cable to part them. Suitable binders for this purpose include waxes and varnishes, such as paraffin wax, or silicone resins, especially for use with fibre optic communication cable. The cable itself should not be so thick that it takes a permanent deformation when coiled, or cannot readily exit the enclosure. The coiling process must not apply stresses to the cable beyond its elastic limits. The cable should be windable, pliable, and uncoilable with a tendency to avoid kinking, snagging on itself or hockling (the formation of tight spiral loops in twisted cables when lengthwise tension is relaxed).

To at least partially reduce these problems, the cable may be given a back twist, by up to one turn per coil of cable, when the coil is being formed, so that it can be more cleanly uncoiled.

Suitable materials for the cables are any that serve the intended purpose, particularly of providing communication means, and tolerate the pipeline environment. Any compatible fluid may be used to drive the deploying pig through the pipeline. A typical fibre optic cable may consist of a silica glass core, a silicone sheath to the core, and an outer coating of PTFE to impart abrasion resistance and to resist high temperatures. Cables may be reinforced, for example by Kevlar™ fibre braiding, to add tensile strength, especially for steeply inclined or vertical pipelines.

The invention is illustrated, by way of example only, in the accompanying diagrammatic drawings, in which.

Figure 1:
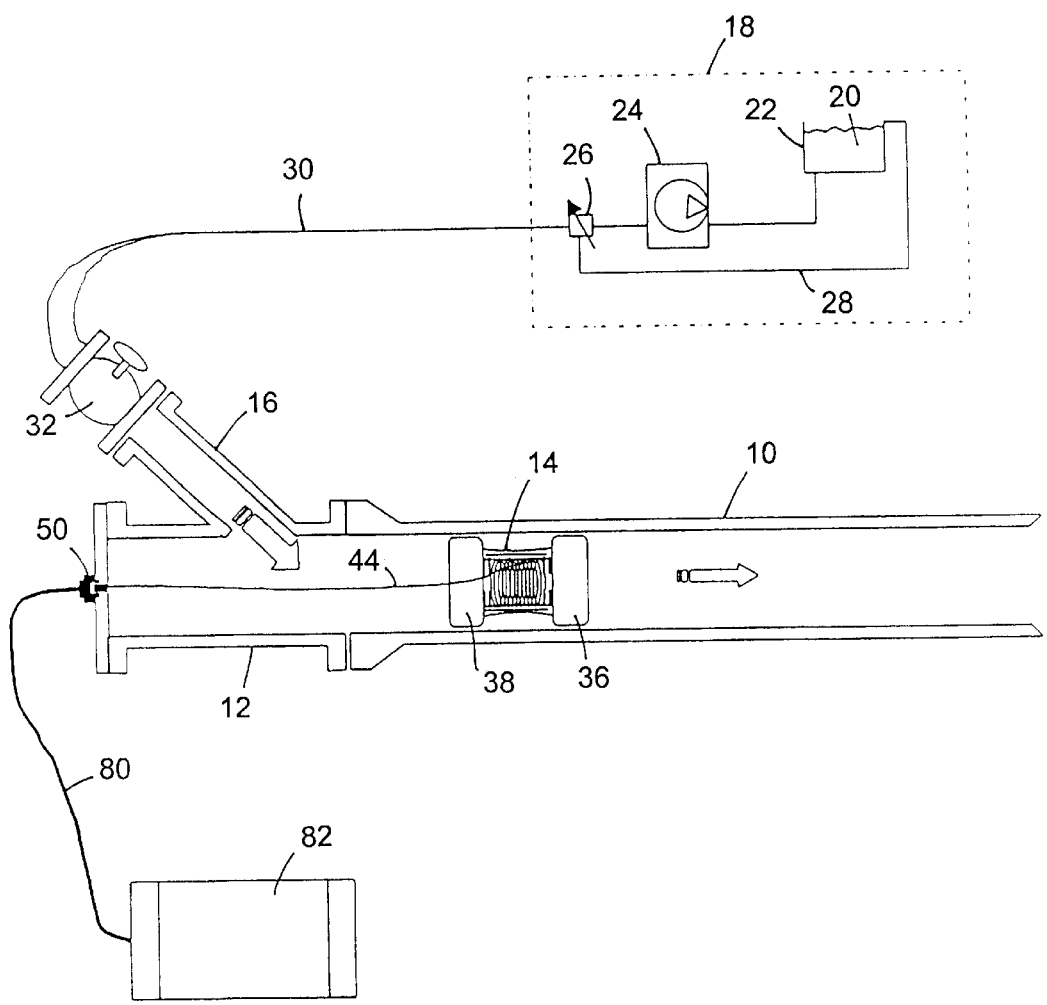
FIG. 1 shows typical apparatus in accordance with the invention for deploying a fibre optic communication cable in a pipeline.

According to FIG. 1, one end of a circular section pipeline 10 is provided with a removable end section which serves as a launcher 12 for a pig 14. The pig is driven down the pipeline by deployment fluid admitted through an angled side inlet 16 in the launcher.

The deployment fluid comes from a source 18 in which fluid 20 is pumped from a reservoir 22 by pump 24 through pressure regulating valve 26. Excess fluid is returned from the valve to the reservoir through return line 28, while fluid at the desired reduced pressure is pumped through deployment fluid feed line 30 to main valve 32 controlling the rate at which fluid is admitted to the inlet of the launcher.

Figure 2:
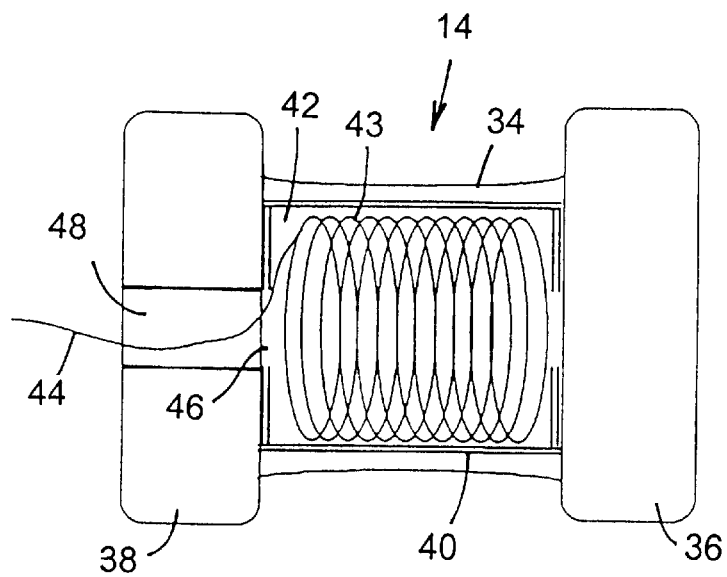
FIG. 2 shows a pipeline pig of the kind illustrated in FIG. 1.

As shown also in FIG. 2, pig 14 consists of a body 34 having a forward end flange 36 and a rearward end flange 38. The body contains a cassette 40 embedded within it, forming an enclosure 42 for a coil 43 of fibre optic cable 44, one end of which passes out of the cassette through an exit 46 at its rearward end opening into axial passage 48 through rearward end flange 38.

Referring again to FIG. 1, the remote end of cable 44 is restrained at anchor 50 in the closed end wall of launcher 12. Accordingly, as deployment fluid is admitted to the launcher and enters pipeline 10 behind pig 14, the pressure of the fluid drives the pig down the pipeline, while fibre optic cable 44 is smoothly paid out from its coil in the rearwardly opening cassette 40 inside the pipeline pig. The only tension in the cable is that required to unwind it from the coil, and once deployed it remains stationary with respect to the pipeline. As the pig travels down the pipeline, it gradually lightens as cable is deployed from it, so as the length of pipeline through which deployment fluid has to be pumped increases, the weight that has to be moved by the fluid actually reduces.

Figure 3:
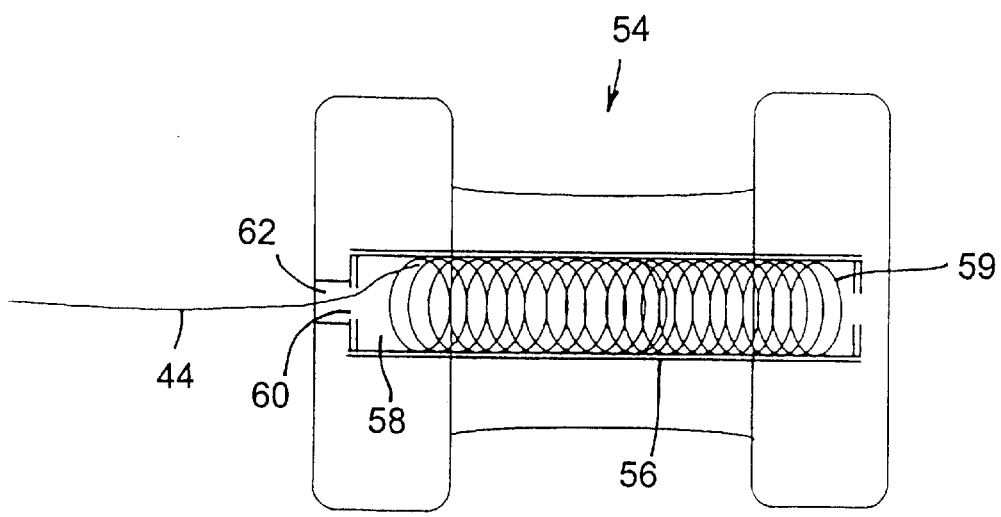
FIG. 3 shows a second embodiment of a pipeline pig.

FIG. 3 shows an alternative pig 54, with a longer, narrower cassette 56 defining a correspondingly shaped and sized enclosure 58 containing a coil 59 of the cable 44 which is drawn out of the enclosure through rearwardly facing exit 60 and axial rearward flange aperture 62.

Figure 4:
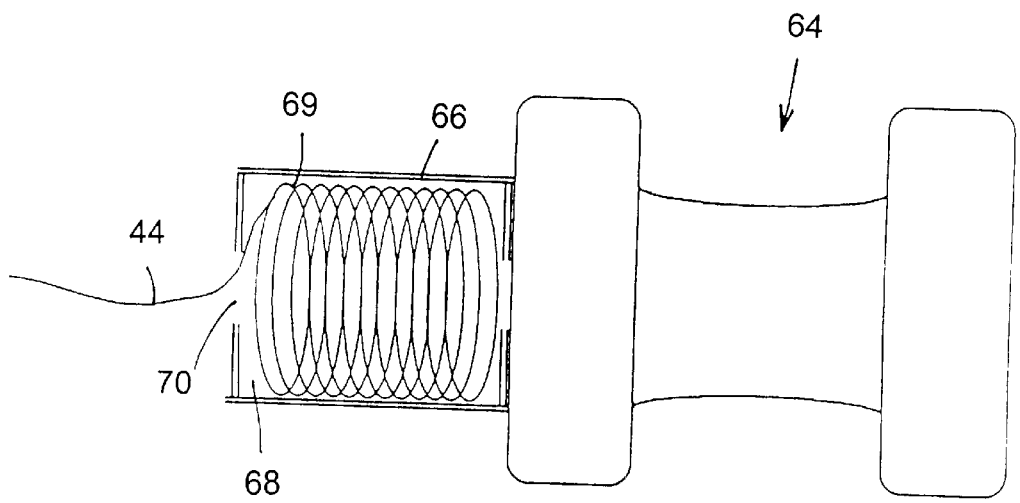
FIG. 4 shows a third embodiment of a pipeline pig.

FIG. 4 shows a modified pig 64 in which cassette 66 defining enclosure 68 is rigidly mounted on the rearward end of the pig. Coil 69 of cable 44 is deployed from the cassette through rearwardly facing exit 70.

Figure 5:
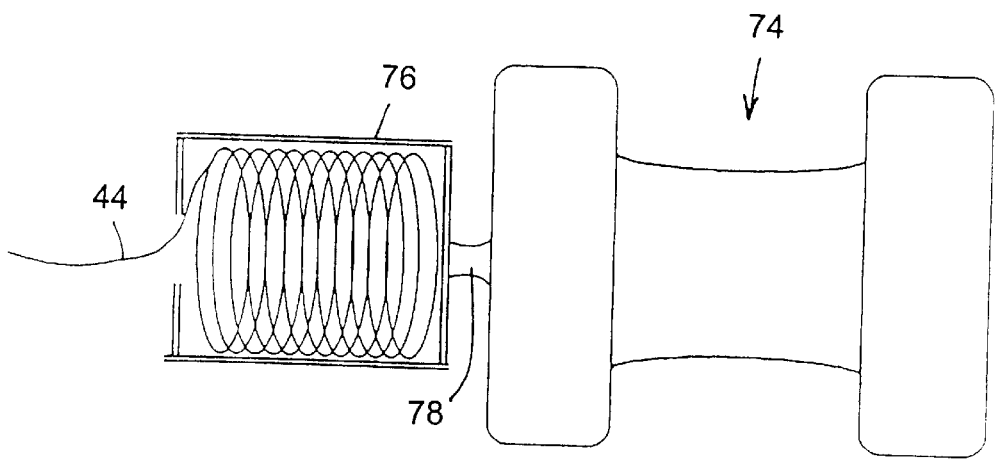
FIG. 5 shows a fourth embodiment of a pipeline pig for use in the invention.

FIG. 5 shows a further variation in which a pig 74, similar to pig 64 of FIG. 4, carries a cassette 76, similar to the cassette 66 of FIG. 4. The difference is that cassette 76 is mounted to the rearward end of the pig by means of a flexible coupling 78 which permits the assembly to pass around relatively sharp bends in the pipeline. Cassettes 66 and 76 are both detachable from their respective pigs 64 and 74 so that they can be conveniently cleaned and reloaded with cables between deployment runs.

Referring again to FIG. 1, the anchor 50 for cable 44 is also connected externally of the launcher by instrumentation cable 80 to thermal profiling system instrumentation 82. The thermal profiling system operates to detect temperature along the pipeline by discharging a beam of light down fibre optic cable 44 and measuring the reflected light as modified by the material of the fibre optic cable at different temperatures down the length of the pipeline 10, in a manner that is known in itself. Instrumentation 82 may take different forms according to the nature of the data communicated by cable 44.

Figure 6:
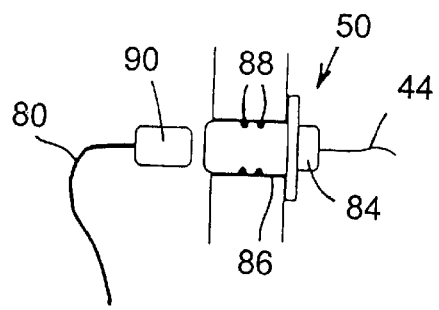
FIG. 6 is an enlarged view of a pressure penetrator for connecting the deployed cable with instrumentation, as shown in FIG. 1.

FIG. 6 is a detail illustrating the operative connection between instrumentation cable 80 and fibre optic cable 44 at anchor 50. The anchor provides a mechanical tether point 84 for the cable, to ensure that it is paid out from the travelling pig. Behind the tether point is a pressure penetrator 86, including pressure seals 88, into which optical coupler 90 on the end of instrumentation cable 80 can be plugged to make optical contact between cable 44 and the thermal profiling system 82. Similar arrangements can be provided for electrical connectors and penetrators when the communication cable is an electrical cable.

The pig is driven along the pipeline until either it has taken the cable as far as the cable needs to go, or, more commonly, the pig reaches a distant access point at which it can be removed from the pipeline and any desired further connection made to communication cable 44.

In a typical application installing fibre optic cable to measure the pipeline temperature, the internal diameter of the pipeline is 244 mm and the pig flange diameters are 235 mm, ensuring that the pig can be effectively driven down the pipeline at about 0.9 meters per second driven by a fluid flow of 1.0 meters per second. Two thousand meters of cable, diameter 0.85 mm, can be deployed from a coil in a cassette of diameter 180 mm and length 150 mm.

I claim:

1. Pipeline cable deployment apparatus comprising a pipeline pig having, in use, forward and rearward ends, said pig carrying an enclosure containing a coil of cable, the enclosure having an exit for the cable rearwardly of the pig, said apparatus further comprising a pig launcher located at one end of the pipeline, the launcher including an anchorage for an end of the cable to be deployed and a pressure penetrator for operatively connecting external cable to the cable that is to be deployed in the pipeline.

2. A pipeline cable deployment apparatus according to claim 1 wherein said cable is a fiber optic cable.

3. A pipeline cable deployment apparatus according to claim 1 wherein said cable is a fiber optic cable providing distributed temperature measurement in said pipeline.

4. A pipeline cable deployment apparatus according to claim 1 wherein the pig has lateral flanges at the forward and rearward ends adapted to stabilize it and guide it in the pipeline and allow it to be driven forward by pipeline fluid.

5. A pipeline cable deployment apparatus according to claim 1 wherein the enclosure is located on a rearward end of the pig.

6. A pipeline cable deployment apparatus according to claim 5 wherein the enclosure is flexibly connected to the pig, whereby to articulate the pig and enclosure assembly for use in a curved pipeline.

7. A pipeline cable deployment apparatus according to claim 1 wherein the launcher includes an inlet for fluid for driving the pig along the pipeline.

8. A pipeline cable deployment apparatus according to claim 1 wherein the coil is a static coil made up of multiple layers of cylindrical windings.

9. Pipeline cable deployment apparatus comprising a pipeline pig having, in use, forward and rearward ends, said pig carrying an enclosure containing a coil of cable, the enclosure having an exit for the cable rearwardly of the pig, wherein the coil is a static coil made up of multiple layers of cylindrical windings avid wherein the coiled cable is coated with a weak adhesive, sufficient to bind the turns of the coil together unless tension is applied to the cable to part them.

10. An apparatus according to claim 9 wherein the adhesive is selected from waxes, varnishes, and silicone resins.

11. Pipeline cable deployment apparatus comprising a pipeline pig having, in use, forward and rearward ends, said pig carrying an enclosure containing a coil of cable, the enclosure having an exit for the cable rearwardly of the pig, wherein the coil is a static coil made up of multiple layers of cyliridrical windings, and wherein the cable is coiled on to the coil with a back twist, by up to one turn per coil of cable.

12. A method of deploying a cable in a pipeline comprising the steps of providing a pipeline pig carrying an enclosure with a coil of cable having an end extending out of a rearwardly directed exit thereof; providing a pig launcher at one end of the pipeline with a cable anchorage therein; fastening said one end of the cable to the anchorage to restrain said one end; and, launching the pig into the pipeline from said pig launcher, thereby driving the pig forwardly along the pipeline away from said one end.

13. A method of deploying a cable in a pipeline, according to claim 12, including the step of employing, as said cable, a fiber optic cable.

14. A method of deploying a cable in a pipeline, according to claim 12, including the step of employing, as said cable, a fiber optic cable providing distributed temperature measurement in said pipeline.

15. A method of deploying a cable in a pipeline according to claim 12, including the step of providing lateral flanges on said pig at forward and rearward ends thereof, said flanges being adapted to stabilise it and guide it in the pipeline and allow it to be driven forward by pipeline fluid.

16. A method of deploying a cable in a pipeline according to claim 12 wherein the enclosure is located on a rearward end of the pig.

17. A method of deploying a cable in a pipeline according to claim 16 wherein the enclosure is flexibly connected to the pig, whereby to articulate the pig and enclosure assembly for use in a curved pipeline.

18. A method of deploying a cable in a pipeline according to claim 12 wherein the launcher includes an inlet for fluid for driving the pig along the pipeline.

19. A method of deploying a cable in a pipeline according to claim 12 wherein the coil is a static coil made up of multiple layers of cylindrical windings.

20. An assembly of pipeline cable deployment apparatus and a pipeline comprising a pipeline pig having, in use, forward and rearward ends, said pig carrying an enclosure containing a coil of cable, the enclosure having an exit for the cable rearwardly of the pig, wherein the pig has a body and means extending laterally therefrom for positioning the pig in the pipeline, the enclosure being located within the pig body and the laterally extending means comprising lateral flanges of lesser width than a diameter of an inside of the pipeline at the forward and rearward ends for stabilizing it and guiding it in the pipeline and for allowing it to be driven forward by pipeline fluid.

21. The assembly according to claim 20, wherein said enclosure is operative to contain a cable cassette of diameter 180 mm, length 150 mm, and capable of containing 2000 m of 0.85 mm diameter cable.

22. An assembly of pipeline cable deployment apparatus and a pipeline comprising a pipeline pig having, in use, forward and rearward ends, said pig carrying an enclosure containing a coil of cable, the enclosure having an exit for the cable rearwardly of the pig, wherein the pig has a body and means extending laterally therefrom for positioning the pig in the pipeline, the enclosure being located within the pig body and the laterally extending means comprising lateral flanges of lesser width than a diameter of an inside of the pipeline at the forward and rearward ends for stabilizing it and guiding it in the pipeline and for allowing it to be driven forward by pipeline fluid, the pipeline being circular, said flanges having a diameter of 235 mm and said pipeline having an internal diameter of 244 mm.

23. The combination of pipeline cable deployment apparatus and a pipeline, the pipeline cable deployment apparatus comprising a pipeline pig having, in use, forward and rearward ends, said pig having a body within which an enclosure containing a coil of cable is carried, the enclosure having an exit for the cable rearwardly of the pig, wherein the pig body has a smaller cross-section than an interior cross-section of the pipeline, providing a path for pipeline fluid therebetween and has flanges of lesser width than a diameter of an inside of the pipeline at forward and rearward ends thereof extending laterally outwardly around an entire outside of the pig to a location adjacent an interior wall of the pipeline into said path to obstruct flow of pipeline fluid along said path for enabling the pig to be driven forward by the pipeline fluid and for stabilizing the pig and guiding it in the pipeline.

* * * * *